US009317201B2

(12) United States Patent
Zhai et al.

(10) Patent No.: US 9,317,201 B2
(45) Date of Patent: Apr. 19, 2016

(54) PREDICTIVE VIRTUAL KEYBOARD

(71) Applicant: Google Inc., Mountain View, CA (US)

(72) Inventors: Shumin Zhai, Los Altos, CA (US); Lawrence Diao, Vienna, VA (US)

(73) Assignee: Google Inc., Mountain View, CA (US)

( * ) Notice: Subject to any disclaimer, the term of this patent is extended or adjusted under 35 U.S.C. 154(b) by 339 days.

(21) Appl. No.: 13/936,913

(22) Filed: Jul. 8, 2013

(65) Prior Publication Data

US 2013/0314352 A1 Nov. 28, 2013

Related U.S. Application Data

(63) Continuation of application No. 13/479,074, filed on May 23, 2012, now Pat. No. 8,484,573.

(51) Int. Cl.
*G06F 3/0488* (2013.01)
*G06F 3/023* (2006.01)

(52) U.S. Cl.
CPC .......... *G06F 3/04886* (2013.01); *G06F 3/0237* (2013.01)

(58) Field of Classification Search
CPC .................................................. G06F 3/0488
See application file for complete search history.

(56) References Cited

U.S. PATENT DOCUMENTS

| 6,286,064 | B1 | 9/2001 | King et al. |
|---|---|---|---|
| 6,292,179 | B1 | 9/2001 | Lee |
| 6,801,190 | B1 | 10/2004 | Robinson et al. |
| 7,030,863 | B2 | 4/2006 | Longe et al. |
| 7,042,443 | B2 | 5/2006 | Woodard et al. |
| 7,075,520 | B2 | 7/2006 | Williams |
| 7,088,345 | B2 | 8/2006 | Robinson et al. |
| 7,098,896 | B2 | 8/2006 | Kushler et al. |
| 7,145,554 | B2 | 12/2006 | Bachmann |
| 7,151,530 | B2 | 12/2006 | Roeber et al. |
| 7,199,786 | B2 | 4/2007 | Suraqui |
| 7,250,938 | B2 | 7/2007 | Kirkland et al. |
| 7,251,367 | B2 | 7/2007 | Zhai |
| 7,277,088 | B2 | 10/2007 | Robinson et al. |
| 7,453,439 | B1 | 11/2008 | Kushler et al. |
| 7,508,324 | B2 | 3/2009 | Suraqui |
| 7,706,616 | B2 | 4/2010 | Kristensson et al. |

(Continued)

OTHER PUBLICATIONS

Search Report from corresponding Application No. GB1309339.8, dated Jun. 27, 2013, 4 pp.

(Continued)

*Primary Examiner* — Steven Sax
*Assistant Examiner* — David Choi
(74) *Attorney, Agent, or Firm* — Shumaker & Sieffert, P.A.

(57) ABSTRACT

In general, aspects of this disclosure are directed to techniques for predictive text correction and completion for text entry using virtual keyboards on touch-sensitive displays. A user may be able to type on a representation of a virtual keyboard displayed on touch-sensitive displays by contacting representations of virtual keys included in the virtual keyboard, and the word the user intended to type on the virtual keyboard may be predicted and displayed in place of characters associated with the virtual keys actually contacted by the user. In some examples of the present disclosure, a virtual spacebar key included in the virtual keyboard may be treated in a probabilistic fashion to determine whether a contact received by the touch-sensitive display is intended to select the virtual spacebar key to perform an autocorrect or autocomplete function.

27 Claims, 8 Drawing Sheets

(56) References Cited

U.S. PATENT DOCUMENTS

| | | | |
|---|---|---|---|
| 7,716,579 B2 | 5/2010 | Gunn et al. | |
| 7,750,891 B2 | 7/2010 | Stephanick et al. | |
| 7,886,233 B2 | 2/2011 | Rainisto et al. | |
| 7,921,361 B2 | 4/2011 | Gunn et al. | |
| 8,036,878 B2 | 10/2011 | Assadollahi | |
| 8,135,582 B2 | 3/2012 | Suraqui | |
| 8,140,560 B2 | 3/2012 | Dinn | |
| 8,782,556 B2 * | 7/2014 | Badger et al. | 715/816 |
| 8,904,309 B1 * | 12/2014 | Zhai et al. | 715/816 |
| 2006/0119582 A1 | 6/2006 | Ng et al. | |
| 2006/0152496 A1 | 7/2006 | Knaven | |
| 2006/0176283 A1 | 8/2006 | Suraqui | |
| 2006/0256139 A1 | 11/2006 | Gikandi | |
| 2006/0265648 A1 * | 11/2006 | Rainisto et al. | 715/534 |
| 2006/0265668 A1 * | 11/2006 | Rainisto | 715/816 |
| 2007/0247442 A1 | 10/2007 | Andre et al. | |
| 2008/0076472 A1 | 3/2008 | Hyatt | |
| 2008/0243808 A1 | 10/2008 | Rieman et al. | |
| 2008/0316183 A1 | 12/2008 | Westerman et al. | |
| 2010/0315266 A1 | 12/2010 | Gunawardana et al. | |
| 2011/0041056 A1 | 2/2011 | Griffin et al. | |
| 2011/0078563 A1 | 3/2011 | Archer | |
| 2011/0122081 A1 | 5/2011 | Kushler | |
| 2011/0202876 A1 | 8/2011 | Badger et al. | |
| 2012/0023433 A1 | 1/2012 | Choi et al. | |
| 2012/0032886 A1 | 2/2012 | Ciesla et al. | |
| 2012/0036468 A1 * | 2/2012 | Colley | 715/773 |
| 2012/0036469 A1 | 2/2012 | Suraqui | |
| 2012/0223889 A1 * | 9/2012 | Medlock et al. | 345/168 |
| 2013/0275923 A1 * | 10/2013 | Griffin et al. | 715/863 |
| 2013/0285916 A1 * | 10/2013 | Griffin et al. | 345/169 |
| 2013/0314352 A1 * | 11/2013 | Zhai et al. | 345/173 |
| 2014/0108994 A1 * | 4/2014 | Medlock et al. | 715/773 |

OTHER PUBLICATIONS

German Office Action from German application No. 102013105212.6, dated Apr. 17, 2014, 12 pp.

Office Action from counterpart KP Application No. 10-2013-0058488, mailed Jul. 24, 2013, 6 pages.

U.S. Appl. No. 60/430,338, by Daniel Suraqui, filed Nov. 29, 2002.

U.S. Appl. No. 60/505,724, by Daniel Suraqui, filed Sep. 22, 2003.

* cited by examiner

PREDICTIVE VIRTUAL KEYBOARD

This application is a continuation of U.S. application Ser. No. 13/479,074 filed May 23, 2012, which is incorporated by reference herein in its entirety.

BACKGROUND

Users can input information on a screen using a virtual keyboard which projects a representation of keys on the screen surface. Typing on a virtual keyboard displayed on a touch-sensitive display of a computing device can be a slow and error-prone experience for many users, for example, due to the cramped size and spacing of the virtual keys included in the virtual keyboard, as well as the lack of tactile feel or feedback provided by the virtual keyboard. Methods to better interpret user interactions with virtual keyboard would facilitate user interaction with keyboard-less devices.

SUMMARY

In one aspect, the disclosure is directed to a method. The method can include displaying, at a touch-sensitive display of a computing device, a representation of a virtual keyboard including a plurality of virtual keys. The method can further include detecting, at the touch-sensitive display, a plurality of contacts within a portion of the touch-sensitive display associated with the representation of the virtual keyboard. The method can further include, after detecting the plurality of contacts, detecting, by the touch-sensitive display, a subsequent contact within the portion of the touch-sensitive display associated with the representation of the virtual keyboard. The method can further include determining, based on the plurality of contacts, one or more candidate words, each of the one or more candidate words including at least as many characters as a quantity of contacts included in the plurality of contacts. The method can further include determining if the subsequent contact is intended to select a specified virtual key based at least in part on if the subsequent contact is detected at a location on the touch-sensitive display within an area of the touch-sensitive display associated with the specified virtual key, the area overlapping with at least a portion of a representation of the specified virtual key, the area further including at least a portion of the representation of the virtual keyboard outside of the representation of the specified virtual key, wherein the area is a first area if a top candidate word in the one or more candidate words has a greater number of characters than the quantity of contacts included in the plurality of contacts, and wherein the area is a second area, different from the first area, if the top candidate word has a same number of characters as the quantity contacts in the plurality of contacts. The method can further include, responsive to determining that the subsequent contact is intended to select the specified virtual key, inputting the top candidate word into a text area displayed at the touch-sensitive display.

In another aspect, the disclosure is directed to a computing device. The computing device can include one or more processors. The computing device can also include a touch-sensitive display configured to: display a representation of a virtual keyboard including a plurality of virtual keys, detect a plurality of contacts within a portion of the touch-sensitive display associated with the representation of the virtual keyboard, and, after detecting the plurality of contacts, detect a subsequent contact within the portion of the touch-sensitive display associated with the representation of the virtual keyboard. The computing device can further include an input module operable on the one or more processors and configured to: determine if the subsequent contact is intended to select a virtual spacebar key based at least in part on if the subsequent contact is detected at a location on the touch-sensitive display within an area of the touch-sensitive display associated with the virtual spacebar key, the area overlapping with at least a portion of a representation of the virtual spacebar key, the area further including at least a portion of the representation of the virtual keyboard outside of the representation of the virtual spacebar key, wherein the area is a first area if a top candidate word in the one or more candidate words has a greater number of characters than the quantity of contacts included in the plurality of contacts, and wherein the area is a second area, larger than the first area, if the top candidate word has a same number of characters as the quantity contacts in the plurality of contacts, and, responsive to determining that the subsequent contact is intended to select the specified virtual key, input the top candidate word into a text area displayed at the touch-sensitive display.

In another aspect, the disclosure is directed to a computer-readable medium comprising instructions. The instructions, when executed by at least one programmable processor, causes the at least one programmable processor to perform operations. The operations can include displaying, at a touch-sensitive display of a computing device, a representation of a virtual keyboard including a plurality of virtual keys. The operations can further include detecting, at the touch-sensitive display, a plurality of contacts within a portion of the touch-sensitive display associated with the representation of the virtual keyboard. The operations can further include, after detecting the plurality of contacts, detecting, by the touch-sensitive display, a subsequent contact within the portion of the touch-sensitive display associated with the representation of the virtual keyboard. The operations can further include determining, based on the plurality of contacts, one or more candidate words, each of the one or more candidate words including at least as many characters as a quantity of contacts included in the plurality of contacts. The operations can further include determining if the subsequent contact is intended to select a virtual spacebar key based at least in part on if the subsequent contact is detected at a location on the touch-sensitive display within an area of the touch-sensitive display associated with the virtual spacebar key, the area overlapping with at least a portion of a representation of the virtual spacebar key, the area further including at least a portion of the representation of the virtual keyboard outside of the representation of the virtual spacebar key. The operations can further include, responsive to determining that the subsequent contact is intended to select the specified virtual key, inputting the top candidate word into a text area displayed at the touch-sensitive display.

In another aspect, the disclosure is directed to a method. The method may include receiving information about a sequence of contacts by a user on a virtual keyboard, the sequence being associated with a predicted word and a probability for the predicted word, wherein the sequence of contacts corresponds to contacts made by the user for an entry of a word. The method may further include receiving information about an additional contact in the sequence of contacts. The method may further include applying a probabilistic model that accounts for information about the spatial location of the additional contact and information about the predicted word, to interpret the additional contact as a (i) user selection of the predicted word having a same number of characters as a number of contacts in the sequence of contacts, (ii) user selection of the predicted word having a greater number of characters than the number of contacts in the sequence of contacts, or (iii) user input of a non-space character. The method may further include updating an input buffer based on the interpretation of the additional contact by the probabilistic model.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
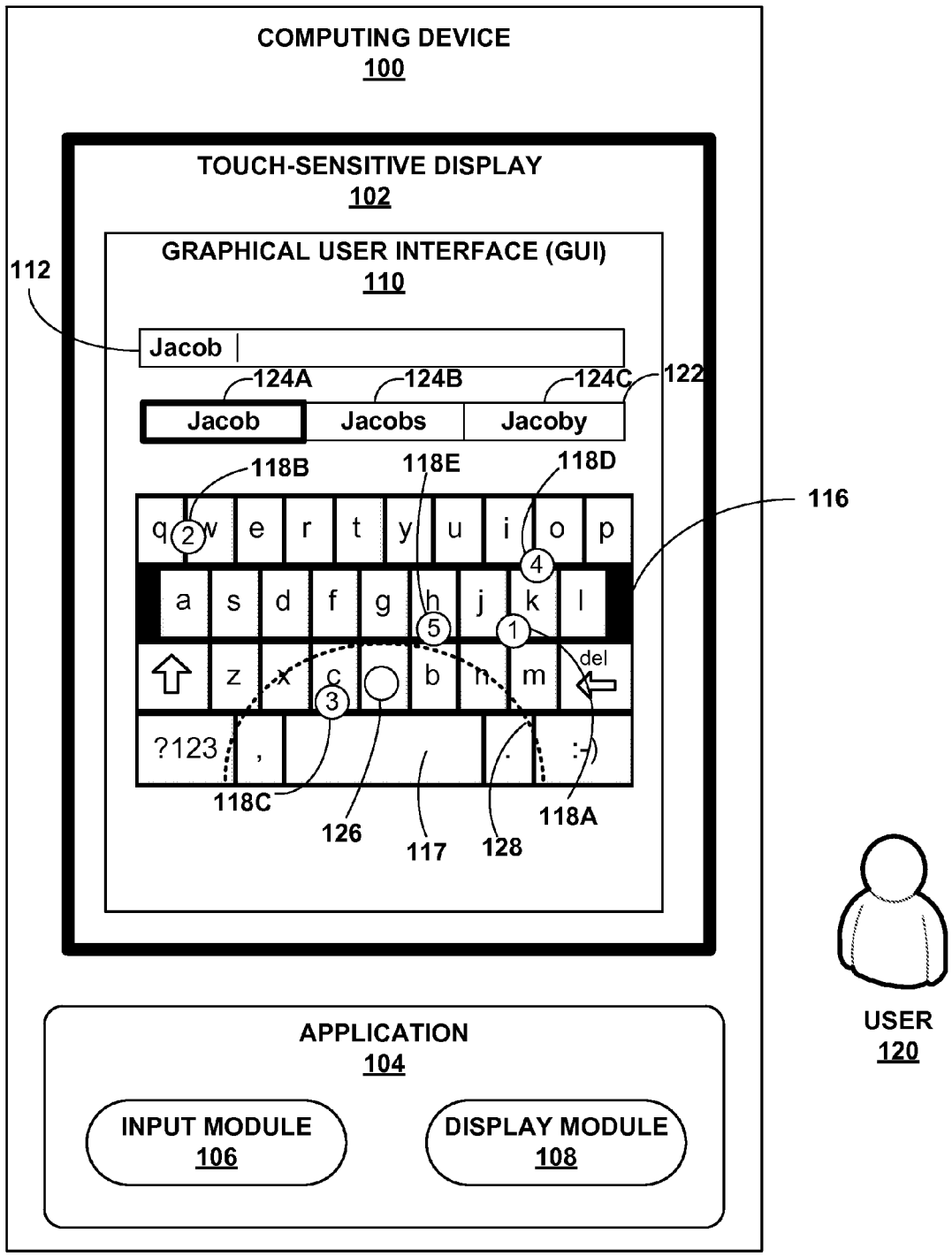
FIG. 1 is a block diagram illustrating an example of a computing device configured to execute one or more applications according to one or more aspects of the present disclosure.

In general, aspects of the present disclosure are directed to techniques for predictive text correction and completion for text entry using virtual keyboards on touch-sensitive displays. For example, a user can create a text entry by contacting virtual keys on a virtual keyboard. The methods described herein can predict the word that the user is intending to type. The predicted word can be used as the text entry and displayed in place of characters associated with the virtual keys actually contacted by the user.

Typically, a certain level of error tolerance may be built into a virtual keyboard in connection with the methods described herein. Such error tolerance may include treating the input of characters via the virtual keyboard in a probabilistic fashion instead of a deterministic fashion. For example, instead of simply outputting the character associated with the representation of a virtual key that is literally contacted by a user, the computing device may predict the character or word that the user actually intended to select, and may output the prediction. Such a determination may be based on factors such as the location of the contact and the distance between the contact and one or more virtual keys.

In some embodiments, the methods herein evaluate a contact associated with entry of a non-character key, such as the virtual spacebar key. In some embodiments, the virtual spacebar key may perform one or more of the following functions, e.g., all of the following functions. The virtual spacebar key, for example, may be contacted to signal an end of a word. The virtual spacebar key, for example, may also be contacted to autocomplete a word after only a partial portion of the word has been typed. The virtual spacebar key, for example, may also be contacted to autocorrect the word preceding the space. Autocompleting a word may include replacing the partial portion of the word with a top candidate word that is longer than the partial portion of the word. Autocorrecting the word may include replacing the word with a top candidate word of the same length. Further, some contacts associated with a contact to the virtual spacebar key may in fact be intended as contacts with nearby keys, such as characters ("x" "c" "v" "b" "n" and "m") on the qwerty keyboard.

Although the input of characters are typically treated in a probabilistic fashion, so that the characters that a user attempts to input can be "guessed" by the computing device even if the user mishits (e.g., contacts a virtual key other than the intended virtual key) one or more virtual keys, conversely the input of a space character by selecting a representation of a virtual spacebar key is typically be treated in a deterministic fashion, so that the computing device does not "guess" if the user intends to contact the virtual spacebar key but instead outputs a space only if the representation of the virtual spacebar key is literally contacted by a user.

In some examples of the present disclosure, the virtual spacebar key may be treated in a probabilistic fashion to determine whether a contact received by the touch-sensitive display is intended to select the virtual spacebar key to perform an autocorrect or autocomplete function.

As a sequence of contacts is received by a virtual keyboard displayed by the touch-sensitive display, the computing device may determine one or more candidate words based on the contacts, including a top candidate word that has the highest probability of being the word that the user intends to input based on the contacts and/or other context information.

If the top candidate word has more characters than the number of contacts in the plurality of contacts, then selection of the virtual spacebar key may autocomplete the currently-typed word. If instead the top candidate word has the same number of characters as the number of contacts in the plurality of contacts, then selection of the virtual spacebar key may autocorrect the currently-typed word. Because it may generally be more probable that a user would intentionally select the virtual spacebar key after the user thinks that he has completely typed a word, and less probable that a user would select the virtual spacebar key without having completely typed a word, there may be a greater tolerance for determining whether the user intended to select the virtual spacebar key if the top candidate word has the same number of characters as contacts in the plurality of contacts than if the top candidate word has more characters than the number of contacts in the plurality of contacts.

Therefore, if the top candidate word has the same number of characters as contacts in the plurality of contacts, then a contact received by the virtual keyboard after the virtual keyboard receives the plurality of contacts may be considered as selecting the virtual space key if the contact occurs within a first distance from a location within the representation of the virtual spacebar key. However, if the top candidate word has more characters than the number of contacts in the plurality of contacts, then the contact received after the plurality of contacts may be considered as selecting the virtual space key if the contact occurs within a second distance from the location within the representation of the virtual spacebar key, where the second distance is less than the first distance. In this way, there is less tolerance for selecting the virtual spacebar key when selecting the virtual spacebar key would cause the computing device to autocomplete a word with a top candidate word. Besides the virtual space key, any other virtual keys associated with signaling the completion of a word (such as a period key, comma key, semicolon key, or colon key) may configured to behave similarly to the virtual space key discussed above.

FIG. 1 is a block diagram illustrating an example of a computing device configured to execute one or more applications according to one or more aspects of the present disclosure. As shown in FIG. 1, computing device 100 may include touch-sensitive display 102 and application 104. User 120 may contact touch-sensitive display 102 to type on virtual keyboard 116 displayed at touch-sensitive display 102 to input text into text area 112. Application 104 may predict words based on contact made by user 120 and may replace the input text 112 with a predicted word that is the most probable input. Application 104 may predict words based at least in part on the text inputted by user 120 (a.k.a. a language model) and/or at least in part on the touch point locations of the contact by user 120 (a.k.a. a spatial model).

Computing device 100, in some examples, may include or may be a part of a mobile computing device (e.g., a mobile phone, smart phone, netbook, laptop, tablet, etc.), a desktop computer, a server system, etc. Computing device 100 may also connect to a wired or wireless network using a network interface (not shown). An example of computing device 100 is described in further detail with respect to FIG. 3.

Computing device 100 may include one or more input devices that receive user input specifying actions to be performed by computing device 100. Touch-sensitive display 102 may be an input device in computing device 100 that generates one or more signals corresponding to a location on or near the touch-sensitive display 102. In some examples, touch-sensitive display 102 may detect a presence of an input unit, e.g., a finger, pen or stylus that may be in close proximity to, but does not physically touch, touch-sensitive display 102. As used herein, user "contact" may therefore refer to close proximity that is detected by touch-sensitive display 102. In other examples, user "contact" may include physical contact with touch-sensitive display 102 to select the corresponding location, e.g., in the case of a touch-sensitive screen. Touch-sensitive display 102, in some examples, may generate a signal corresponding to the location of the input unit. Signals generated by the selection of the corresponding location(s) may then be provided as data to applications, e.g., application 104, and other components of computing device 100.

Computing device 100 may also include one or more output devices that display content to user 120. Touch-sensitive display 102 may be an output device in computing device 100 that displays graphical content responsive to electronic signaling or other directives from computing device 100. Graphical content, generally, may include any visual depiction displayed at touch-sensitive display 102. Examples of graphical content may include images, text, videos, visual objects and/or visual program components such as scroll bars, text boxes, buttons, etc. Application 104, for example, may direct touch-sensitive display 102 to display graphical user interface (GUI) 110.

Application 104 executing on computing device 100 may include program instructions and/or data that are executable by computing device 100. Examples of application 104 may include a web browser, email application, text messaging application or any other application that receives user input and/or displays graphical content. Application 104 may cause GUI 110 to be displayed at touch-sensitive display 102.

Graphical user interface 110 may include interactive and/or non-interactive graphical content that presents information of computing device 100 in human-readable form. GUI 110 may enable user 120 to interact with application 104 through touch-sensitive display 102. In this way, GUI 110 may enable user 120 to create, modify, and/or delete data of computing device 100. GUI 110 may include a representation of virtual keyboard 116 that is displayed at touch-sensitive display 102. Virtual keyboard 116 may include virtual keys, and user 120 may contact touch-sensitive display 102 to type on virtual keyboard 116 to provide input to text area 112 of GUI 110. Text area 112 may be any GUI 110 element that is configured to display text recently processed by application 104 responsive to contact made by user 120 on portions of touch-sensitive display 110 associated with virtual keyboard 116. Input module 106 of application 104 may process the plurality of contacts detected to direct display module 108 to display input text in text area 112. Alternatively, input module 106 may also direct display module 108 to display input text in any other text area. In some examples, text area 112 may be considered an input buffer.

The virtual keys in virtual keyboard 116 may include a plurality of virtual keys associated with a plurality of characters as well as a plurality of virtual keys associated with a plurality of terminator symbols (alternatively, "terminators") that, in accordance with the particular language displayed by virtual keyboard 116, indicate that a word of the language is complete, or "terminated." Terminators associated with virtual keys in virtual keyboard 116 may include but are not limited to a period, comma, a space, a colon, a semi-colon, parentheses, and quotation marks. By contacting a virtual key displayed at touch-sensitive display 102 that is associated with a terminator, user 120 may input the terminator to application 104 for display in text area 112. In one example, a space may be associated with virtual spacebar key 117 of virtual keyboard 116 and may be used by user 120 to terminate words input to virtual keyboard 116. Virtual keyboard 116 may, in other examples, include virtual keys associated with characters, words, and/or terminators of any language.

Input module 106 of application 104 may be an input method editor that may receive data from touch-sensitive display 102 describing one or more contacts detected at touch-sensitive display 102. For example, touch-sensitive display 102 may generate a signal that represents locations of touch-sensitive display 102 where contact was detected, and the signal may be sent to input module 106. In some examples, the signal may include a set of coordinates corresponding to a coordinate system used by touch-sensitive display 102 to identify locations of touch-sensitive display 102 where contact was detected. In some examples, touch-sensitive display 102 may include a pressure-sensitive screen that detects an amount of pressure applied in the course of being contacted by user 120. In such examples, the signal may include pressure data describing the amount of pressure applied. Input module 106 may process the signal received from touch-sensitive display 102 to identify one or more virtual keys in virtual keyboard 116 that was selected by the contacts detected at touch-sensitive display 102. In some aspects, input module 106 may be a virtual keyboard library or module linked to or otherwise executed by application 104.

Input module 106 may execute the actions, which in some instances may cause display module 108 to update GUI 110. For example, upon input module 106 identifying a contact made by user 120 at a portion of touch-sensitive display 102 associated with a virtual key in virtual keyboard 116, input module 106 may execute an action directing display module 108 to input the character associated with the virtual key into text area 112.

The following notations are used throughout the disclosure to better illustrate the aspects of the disclosure:

[c1 c2 ... cN]—a word with N characters;

[c1 c2 ... cM]—the first M characters entered for a word with N characters [c1 c2 ... cN], where M is less than N;

[a b c d]—virtual keys associated with the characters a, b, c, and d were contacted in order;

[a' b' c' d']—virtual keys associated with the characters a, b, c, and d, or the vicinity of those virtual keys, were contacted in order;

sp—space key; and

[c1|c2]—contact was detected somewhere within or between virtual keys associated with characters c1 and c2.

As shown in FIG. 1, a plurality of contacts 118A-118E ("plurality of contacts 118") may be detected within a portion of touch-sensitive display 110 associated with the representation of virtual keyboard 116. In some examples, detecting the plurality of contacts 118 may include receiving, by computing device 100, information about a sequence of contacts by user 120 on the representation of virtual keyboard 116 that corresponds to contacts made by user 120 for an entry of a word. The plurality of contacts 118 may be a sequence of contacts because the plurality of contacts 118 may not occur at the same time. Instead, the plurality of contacts 118 may occur in sequence one contact after another (e.g., contact 118A followed by contact 118B followed by contact 118C followed by contact 118D followed by contact 118E). The plurality of contacts 118 may be made by user 120 as user 120 attempts to input text into text area 112 by contacting the portion of touch-sensitive display 110 associated with the representation of virtual keyboard 116 to select virtual keys in virtual keyboard 116, so that the plurality of contacts 118 may correspond to contacts made by the user for an entry of a word. In some examples, the plurality of contacts 118 may include contacts received by touch-sensitive display 102 subsequent to completion of a prior word or may include contacts initially received by touch-sensitive display 102 from user 120 that was prompted for input. Input module 106 may analyze the plurality of contacts 118 to determine one or more candidate words that meet a threshold probability of being a word that user 120 intended to input via the plurality of contacts 118. Input module 106 may determine one or more candidate words by applying a language model or a spatial model to the plurality of contacts 118 to determine one or more candidate words. Determining one or more candidate words based on the language model may include determining one or more candidate words based on the text characters entered so far by the plurality of contacts 118 made by user 120, or may also be based on previous contacts in the plurality of contacts 118 made by user 120. Determining one or more candidate words based on the spatial model may include determining one or more candidate words based on the spatial location of the touch points of the plurality of contacts 118 and the spatial distribution of the plurality of contacts 118 made by user 120. In some examples, a combination of the language model and the spatial model may be used to determine the one or more candidate words. Input module 106 may associate the sequence of contacts (e.g., the plurality of contacts 118) with a predicted word, and may also associate the sequence of contacts with a probability for the predicted word based on the probabilistic models.

As shown in FIG. 1, contact 118A is not wholly located within any one single virtual key. Rather, contact 118A appears to be partially located within virtual key associated with "j" and a virtual key associated with "k" Therefore, contact 118A may be considered to be j' or k' according to the notation described above because contact 118A is on or within a vicinity of a virtual key associated with "j" and is on or within a vicinity of a virtual key associated with "k", but is not wholly located within the virtual key associated with "j" or wholly located within the virtual key associated with "k".

Because contact 118A is on or within a vicinity of a virtual key corresponding to "j", contact 118B is on or within a vicinity of a virtual key corresponding to "a", contact 118C is on or within a vicinity of a virtual key corresponding to "c", contact 118D is on or within a vicinity of a virtual key corresponding to "o", and contact 118E is on or within a vicinity of a virtual key corresponding to "b", [j' a' c' o' b'] may be one possible way to denote that the input produced by the plurality of contacts 118.

Display module 108 may update GUI 110 to present suggestion menu 122 that lists candidate words 124A-124C ("candidate words 124") identified by input module 106 for the recently input text. In some examples, display module 108 may present only a most probable one of candidate words 124 in suggestion menu 122 or otherwise present more/fewer predictions. Display module 108 may order candidate words 124 of suggestion menu 122 according to respective probabilities or another priority arrangement, where candidate words 124 may be ordered from highest priority to lowest. In some examples, user 120 may perform a tap or other gesture in a region of touch-sensitive display 102 that is associated with suggestion menu 122 to select one of candidate words 124.

In the one specific example shown in FIG. 1, based on the plurality of contacts 118, the candidate words 124 identified by input module 106 may include candidate word "Jacob" 124A, candidate word "Jacobs" 124B, and candidate word "Jacoby" 124C. Suggestion menu 122 may order the candidate words 124 from left to right in descending order according to the probability of each of the candidate words 124 being the intended word of user 120. Thus, because candidate "Jacob" 124A is at the leftmost portion of suggestion menu 122, candidate word "Jacob" 124A may be the top candidate word in the candidate words 124 having the highest probability of being the intended word for the plurality of contacts 118.

Each of the candidate words 124 determined by input module 106 may include at least as many characters as a quantity of contacts included in the plurality of contacts 118. For example, because the plurality of contacts 118 includes five contacts, each of the candidate words 124 determined by input module 106 may include at least five characters.

For a candidate word, such as candidate word "Jacob" 124A, that include the same quantity of characters (5) as the quantity of contacts (5) included in the plurality of contacts 118, one or more characters at a position in the candidate word may be determined based on a contact at a corresponding position in the plurality of contacts 118. For example, the first character of the candidate word may correspond with the first contact (e.g., contact 118A) in the plurality of contacts 118, the second character of the candidate may correspond with the second contact (e.g., contact 118B) in the plurality of contacts 118, and so on. In some examples, each of the characters of the candidate word may be determined based on a contact at a corresponding position in the plurality of contacts 118.

One or more of the characters in each of the plurality of candidate words 124 may be determined by input module 106 based at least in part on the location of the corresponding contact in the plurality of contacts 118, so that the location of the corresponding contact is on or within a vicinity of a virtual key corresponding to the character. One or more of the characters in each of the plurality of candidate words 124 may also be determined by input module 106 based at least in part on language modeling, or a combination of the location of one or more of the plurality of contacts 118 and language modeling. For example, one or more characters in each of the plurality of candidate words 124 may also be determined by input module 106 based at least in part on previous contacts in the plurality of contacts 118 and the virtual keys contacted by those previous contacts.

After the plurality of contacts 118 is detected, a subsequent contact 126 may be detected within the portion of touch-sensitive display 110 associated with the representation of virtual keyboard 116. In some examples, detecting the subsequent contact 126 may include receiving information about an additional contact in the sequence of contacts. Input module 106 may determine if the subsequent contact 126 is intended to select a specified virtual key. In some examples, the specified virtual key may be a virtual key associated with a terminator, such as virtual spacebar key 117 associated with a space. In other examples, the specified virtual key may be a dedicated virtual key or other GUI control. For illustrative purposes, the techniques of this disclosure regarding the specified virtual key are described herein with respect to virtual spacebar key 117 as the specified virtual key. However, the techniques may apply to a virtual key associated with any terminator, or to any other suitable virtual key.

By determining if the subsequent contact 126 is intended to select virtual spacebar key 117, instead of determining if the subsequent contact 126 is located within the representation of virtual spacebar key 117, virtual spacebar key 117 may be treated in a probabilistic rather than deterministic fashion, so that subsequent contact 126 may be determined as intending to select virtual spacebar key 117 even if the subsequent contact 126 is not located within the representation of virtual spacebar key 117. Determining if the subsequent contact 126 is intended to select virtual spacebar key 117 may include determining if the subsequent contact 126 meets or exceeds a threshold probability of being intended to select virtual spacebar key 117.

Determining if the subsequent contact 126 meets or exceeds a threshold probability of being intended to select virtual spacebar key 117, may be based at least in part on the location on touch-sensitive display 110 where the subsequent contact 126 is detected. In the current example, virtual spacebar key 117 may be the specified virtual key. An area of touch-sensitive display 110 may be bounded by boundary 128. The area bounded by boundary 128 may overlap with at least a portion of the representation of virtual spacebar key 117, and may further include at least a portion of the representation of virtual keyboard 116 outside of the representation of virtual spacebar key 117. Furthermore, the area bounded by boundary 128 may be smaller than the area of virtual keyboard 116, and the area bounded by boundary 128 may not extend past the boundaries of virtual keyboard 116 in GUI 110. If the subsequent contact 126 is located within the area bounded by boundary 128, the subsequent contact 126 may be determined as exceeding the threshold probability of being intended to select virtual spacebar key 117. As shown in FIG. 1, although subsequent contact 126 is not located within the virtual spacebar key 117, subsequent contact 126 may still be determined by input module 106 as being intended to select the virtual spacebar key 117 because subsequent contact 126 is located within the area bounded by boundary 128.

Determining if the subsequent contact 126 meets or exceeds a threshold probability of being intended to select a specified virtual key, such as the virtual spacebar key 117, may also be based at least in part on a language model, such as the plurality of characters inputted by the plurality of contacts 118 prior to the subsequent contact 126. Determining if the subsequent contact 126 meets or exceeds a threshold probability of being intended to select a specified virtual key, such as the virtual spacebar key 117, may also be based on a combination of the location of subsequent contact 126 and the language model.

If input module 106 determines that the subsequent contact 126 is intended to select the specified virtual key, input module 106 may input the top candidate word 124A in the one or more candidate words plus the character associated with the specified virtual key, such as a space character, into text area 112 to replace the currently inputted text in text area 112. The currently inputted text in text area 112 may, in some examples, be one or more characters inputted via the plurality of contacts 118. As shown in FIG. 1, the word "Jacob" followed by a space character has been inputted into text area 112.

In some examples, input module 106 may apply a probabilistic model, such as the language model and/or the spatial model, that accounts for information about the spatial location of the additional contact (e.g., subsequent contact 126) and information about the predicted word, to interpret the additional contact as a (i) user selection of the predicted word, (ii) user input of a space, or (iii) user input of a non-space character. Interpreting the additional contact may be based at least in part on the spatial location of the additional contact. Interpreting the additional contact may also be based on evaluating the number of characters in the predicted word. Input module 106 may update an input buffer, such as text area 112, based on the interpretation of the additional contact by the probabilistic model, and at least a portion of the updated input buffer may be displayed on touch-sensitive display 102.

Figure 2:
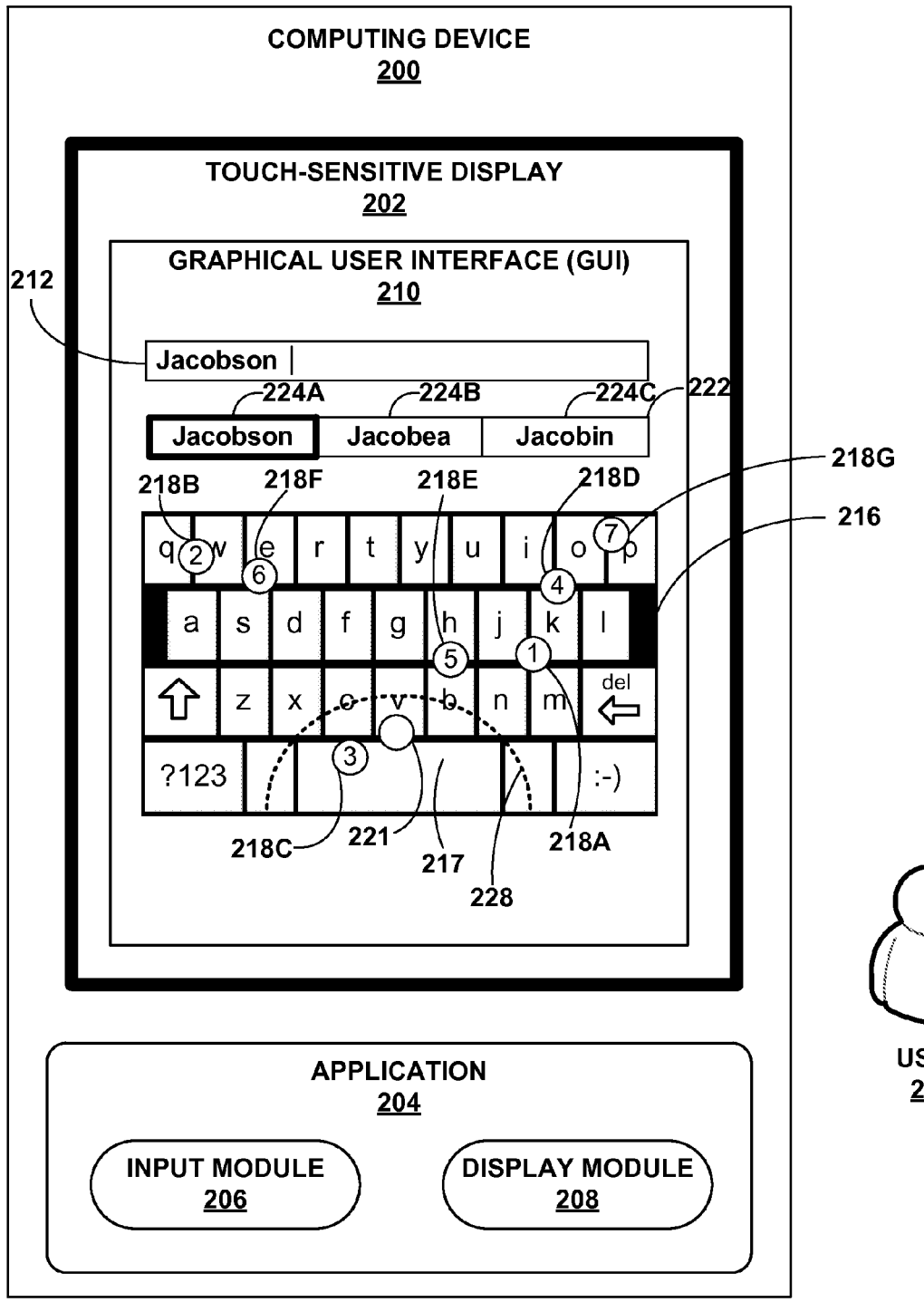
FIG. 2 is a block diagram illustrating an example of a computing device configured to execute one or more applications according to one or more aspects of the present disclosure.

FIG. 2 is a block diagram illustrating an example of a computing device, such as computing device 100 shown in FIG. 1, configured to execute one or more applications according to one or more aspects of the present disclosure. As shown in FIG. 2, computing device 200 may include a touch-sensitive display 202 and an application 204.

Similar to computing device 100 shown in FIG. 1, touch-sensitive display 202 of computing device 200 may display graphical user interface (GUI) 210. GUI 210 may include a representation of virtual keyboard 216 that is displayed at touch-sensitive display 202. Virtual keyboard 216 may include virtual keys, and user 220 may contact touch-sensitive display 202 to type on virtual keyboard 216 to provide input to text area 212 of GUI 210. Text area 212 may display text recently processed by application 204 responsive to contact made by user 220 on portions of touch-sensitive display 210 associated with virtual keyboard 216. Input module 206 of application 204 may process the plurality of contacts detected to direct display module 208 to display input text in text area 212.

As shown in FIG. 2, a plurality of contacts 218A-118G ("plurality of contacts 218") and subsequent contact 226 may be detected within a portion of touch-sensitive display 210 associated with the representation of virtual keyboard 216. The plurality of contacts 218 may be made by user 220 as user 220 attempts to input text into text area 212 by contacting the portion of touch-sensitive display 210 associated with the representation of virtual keyboard 216 to select virtual keys in virtual keyboard 216. Input module 206 may analyze the plurality of contacts 218 to determine one or more candidate words that meet a threshold probability of being a word that user 220 intended to input via the plurality of contacts 218. As shown in FIG. 2, the plurality of contacts 218 made by user 220 may, in one example, be denoted as [j' a' c' o' b' s' o'].

Display module 208 may update GUI 210 to present suggestion menu 222 that lists candidate words 224A-224C ("candidate words 224") identified by input module 206 for the recently input text. In some examples, display module 208 may present only a most probable one of candidate words 224 in suggestion menu 222 or otherwise present more/fewer predictions. Display module 208 may order candidate words 224 of suggestion menu 222 according to respective probabilities or another priority arrangement, where candidate words 224 may be ordered from highest priority to lowest. In some examples, user 220 may tap a region of touch-sensitive display 202 that is associated with suggestion menu 222 to select one of candidate words 224.

According to one specific example shown in FIG. 2, based on the plurality of contacts 218, the candidate words 224 identified by input module 206 may include candidate word "Jacobson" 224A, candidate word "Jacobea" 224B, and candidate word "Jacobin" 224C. Suggestion menu 222 may order the candidate words 224 from left to right in descending order according to the probability of each of the candidate words 224 being the intended word of user 220. Because candidate word "Jacobson" 224A is more probable than candidate word "Jacobea" 224B or candidate word "Jacobin" 224C of being the intended word for input [j' a' c' o' b' s' o'], candidate word "Jacobson" 224A may be the top candidate word in the candidate words 224 for the plurality of contacts 218.

Each of the candidate words 224 determined by input module 206 may include at least as many characters as a quantity of contacts included in the plurality of contacts 218. For example, because the plurality of contacts 218 includes seven contacts, each of the candidate words 224 determined by input module 206 may include at least seven characters. As shown in FIG. 2, candidate word "Jacobson" 224A includes eight characters, while candidate word "Jacobea" 224B and candidate word "Jacobin" 224C each includes seven characters.

For a candidate word, such as candidate word "Jacobson" 224A, that includes a greater quantity of characters than the quantity of contacts included in the plurality of contacts 218, one or more characters at the first M positions in the candidate word, where M is the quantity of contacts in the plurality of contacts 218, may be determined based on a contact at a corresponding position in the plurality of contacts 218. For example, the first character of the candidate word may correspond with the first contact (e.g., contact 218A) in the plurality of contacts 218, the second character of the candidate may correspond with the second contact (e.g., contact 218B) in the plurality of contacts 218, and so on.

For a character to correspond with a contact in the plurality of contacts 218, it may be necessary for the location of that contact in the virtual keyboard 216 to be within the vicinity of a location within the representation of the virtual key associated with the character. Being within the vicinity of a location within the representation of the virtual key may include being within a specified distance from the location within the representation of the virtual key. In some examples, the location within the representation of the virtual key may be the center of the representation of the virtual key. In some examples, the location within the representation of the virtual key may be any point within the representation of the virtual key. In some examples, the location within the representation of the virtual key may be the outermost edge of the representation of the virtual key. In some other examples, the location within the representation of the virtual key may be a location that is a mean location of contacts for the representation of the virtual key. The mean location of contact for the representation of the virtual key, in some examples, may be a statistical mean location of contacts detected by touch-sensitive display 202 during previous user testing to select the virtual key.

After the plurality of contacts 218 is detected, a subsequent contact 221 may be detected within the portion of touch-sensitive display 210 associated with the representation of virtual keyboard 216. Input module 206 may determine if the subsequent contact 221 is intended to select a specified virtual key. In some examples, the specified virtual key may be a virtual key associated with a terminator, such as virtual spacebar key 217 associated with a space. In other examples, the specified virtual key may be a dedicated virtual key or other GUI control. For illustrative purposes, the techniques of this disclosure regarding the specified virtual key are described herein with respect to virtual spacebar key 227 as the specified virtual key. However, the techniques may apply to a virtual key associated with any terminator, or to any other suitable virtual key.

By determining if the subsequent contact 221 is intended to select virtual spacebar key 217, instead of only determining if the subsequent contact 221 is located within the representation of virtual spacebar key 217, virtual spacebar key 217 may be treated in a probabilistic rather than deterministic fashion, so that subsequent contact 221 may be determined as intending to select virtual spacebar key 217 even if the subsequent contact 221 is not located within the representation of virtual spacebar key 217. Determining if the subsequent contact 221 is intended to select virtual spacebar key 217 may include determining if the subsequent contact 221 meets or exceeds a threshold probability of being intended to select virtual spacebar key 217.

Determining if the subsequent contact 221 meets or exceeds a threshold probability of being intended to select virtual spacebar key 217, may be based at least in part on the location on touch-sensitive display 210 where the subsequent contact 221 is detected. In the current example, virtual spacebar key 217 may be the specified virtual key. An area of touch-sensitive display 210 may be bounded by boundary 228. The area bounded by boundary 228 may overlap with at least a portion of the representation of virtual spacebar key 217, and may further include at least a portion of the representation of virtual keyboard 216 outside of the representation of virtual spacebar key 217. Furthermore, the area bounded by boundary 228 may be smaller than the area of virtual keyboard 216, and the area bounded by boundary 228 may not extend past the boundaries of virtual keyboard 216 in GUI 210. If the subsequent contact 221 is located within the area bounded by boundary 228, the subsequent contact 221 may be determined as exceeding the threshold probability of being intended to select virtual spacebar key 217. As shown in FIG. 2, although subsequent contact 221 is not located entirely within the virtual spacebar key 217, subsequent contact 221 may still be determined by input module 206 as being intended to select the virtual spacebar key 217 because subsequent contact 221 is located within the area bounded by boundary 228.

Determining if the subsequent contact 221 meets or exceeds a threshold probability of being intended to select a specified virtual key, such as the virtual spacebar key 217, may also be based at least in part on a language model, such as the plurality of characters inputted by the plurality of contacts 218 prior to the subsequent contact 221. Determining if the subsequent contact 221 meets or exceeds a threshold probability of being intended to select a specified virtual key, such as the virtual spacebar key 217, may also be based on a combination of the location of subsequent contact 221 and the language model.

Typically, the area bounded by a boundary for an example, such as shown in FIG. 2, where the top candidate word includes a greater quantity of characters than the quantity of contacts included in the plurality of contacts may differ from the area bounded by a boundary for an example, such as shown in FIG. 1 where the top candidate word includes the same quantity of characters as the quantity of contacts included in the plurality of contacts. For example, the area bounded by boundary 228 shown in FIG. 2 may typically be smaller than the area bounded by boundary 128 shown in FIG. 1 because it may typically be more likely for a user to intend to select a spacebar key after completely entering a word than if the user has only typed a partial word, and therefore the input module may be more liberal in determining that a contact intends to select the virtual spacebar key. The area bounded by boundary 128 may also overlap the area bounded by boundary 228. In some examples, there may be no difference between the size of the boundary areas regardless of the differences between the quantity of characters of the top candidate word and the quantity of contacts included in the plurality of contacts.

If input module 206 determines that the subsequent contact 221 is intended to select the specified virtual key, input module 206 may input the top candidate word 224A in the one or more candidate words 224 plus the character associated with the specified virtual key, such as a space character, into text area 212 to replace the currently inputted text in text area 212. As shown in FIG. 2, the word "Jacobson" followed by a space character has been inputted into text area 212.

Figure 3:
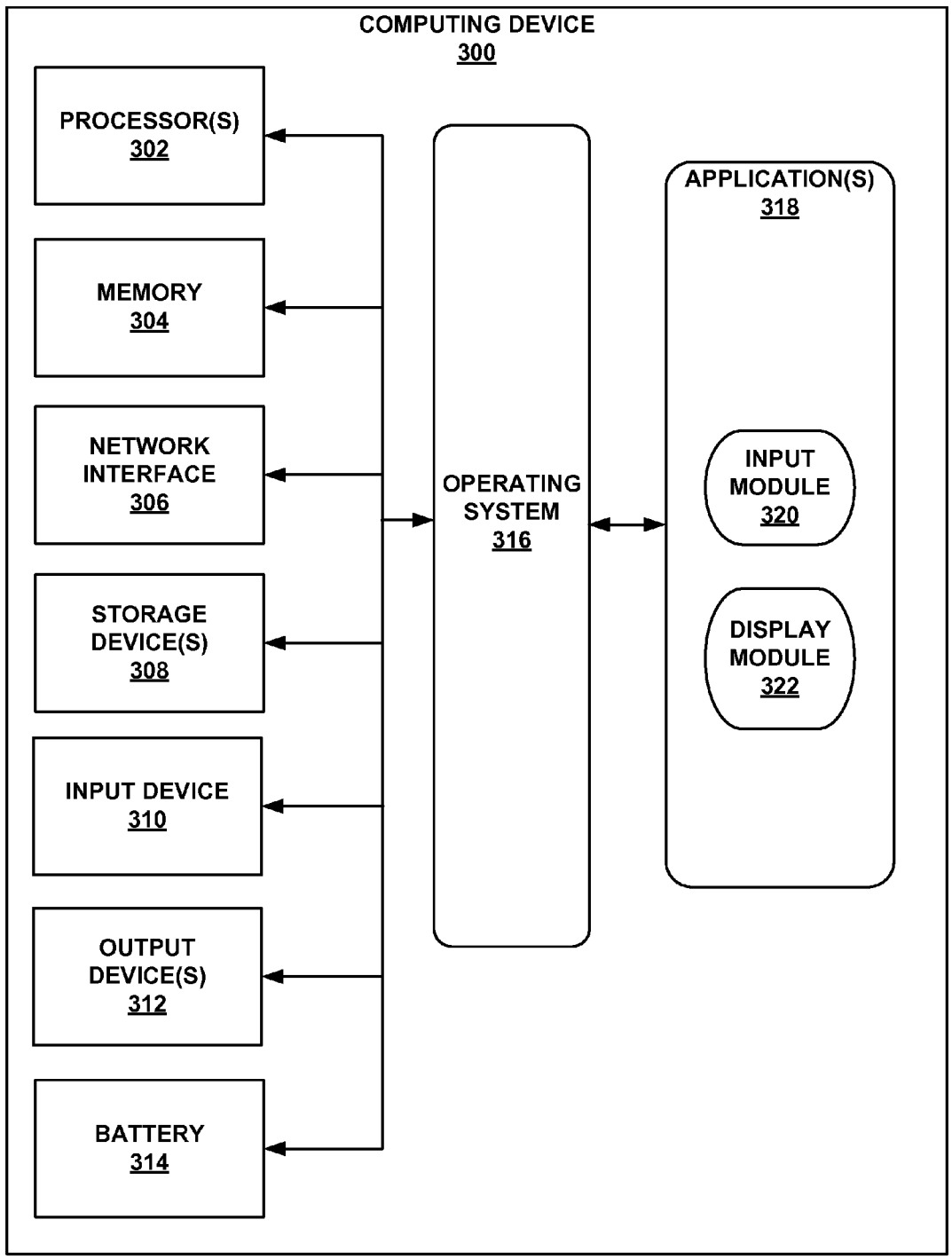
FIG. 3 is a block diagram illustrating further details of one example of computing device according to one or more aspects of the present disclosure.

FIG. 3 is a block diagram illustrating further details of one example of computing device 300, such as computing device 100 shown in FIG. 1 and computing device 200 shown in FIG. 2, according to some aspects of the present disclosure. FIG. 3 illustrates only one particular example of computing device 300. Many other example embodiments of computing device 300 may be used in other instances.

As shown in the specific example of FIG. 3, computing device 300 may include one or more processors 302, memory 304, a network interface 306, one or more storage devices 308, input device 310, one or more output devices 312, and battery 314. Computing device 300 may also include an operating system 316. Computing device 300, in one example, may further include one or more applications 318. One or more applications 318 may also be executable by computing device 300. Components of computing device 300 may be interconnected (physically, communicatively, and/or operatively) for inter-component communications.

One or more processors 302, in one example, may implement functionality and/or process instructions for execution within computing device 300. For example, one or more processors 302 may be capable of processing instructions stored in memory 304 and/or instructions stored on one or more storage devices 308.

Memory 304, in one example, may store information within computing device 300 during operation. Memory 304, in some examples, may represent a computer-readable storage medium. In some examples, memory 304 may be a temporary memory, meaning that a primary purpose of memory 304 may not be long-term storage. Memory 304, in some examples, may be described as a volatile memory, meaning that memory 304 may not maintain stored contents when computing device 300 is turned off. Examples of volatile memories may include random access memories (RAM), dynamic random access memories (DRAM), static random access memories (SRAM), and other forms of volatile memories known in the art. In some examples, memory 304 may be used to store program instructions for execution by one or more processors 302. Memory 304, in one example, may be used by software or applications running on computing device 300 (e.g., one or more applications 318) to temporarily store data and/or instructions during program execution.

One or more storage devices 308, in some examples, may also include one or more computer-readable storage media. One or more storage devices 308 may be configured to store larger amounts of information than memory 304. One or more storage devices 308 may further be configured for long-term storage of information. In some examples, one or more storage devices 308 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 300, in some examples, may also include a network interface 306. Computing device 300, in such examples, may use network interface 306 to communicate with external devices via one or more networks, such as one or more wired or wireless networks. Network interface 306 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 300 may use network interface 306 to wirelessly communicate with an external device (not shown) such as a server, mobile phone, or other networked computing device.

Computing device 300 may also include one or more input devices 310. Input device 310, in some examples, may be configured to receive input from a user through tactile, electromagnetic, audio, and/or video feedback. Examples of input device 310 may include a touch-sensitive display (e.g., touch-sensitive display 102 shown in FIG. 1 or touch-sensitive display 202 shown in FIG. 2), mouse, physical keyboard, voice recognition system, video camera, microphone or any other type of device for detecting gestures by a user. In some examples, a touch-sensitive display may include a presence-sensitive screen.

One or more output devices 312 may also be included in computing device 300. One or more output devices 312, in some examples, may be configured to provide output to a user using tactile, audio, or video stimuli. One or more output devices 312, in one example, may include a display (e.g., touch-sensitive display 102 shown in FIG. 1 or touch-sensitive display 202 shown in FIG. 2), sound card, a video graphics adapter card, or any other type of device for converting a signal into an appropriate form understandable to humans or machines. Additional examples of one or more output device 312 may include a speaker, a cathode ray tube (CRT) monitor, a liquid crystal display (LCD), or any other type of device that can generate intelligible output to a user.

Computing device 300, in some examples, may include a battery 314, which may be rechargeable and provide power to computing device 300. Battery 314, in some examples, may be made from nickel-cadmium, lithium-ion, or other suitable material.

Examples of computing device 300 may include operating system 316. Operating system 316 may control the operation of components of computing device 300. For example, operating system 316 may facilitate the interaction of one or more applications 318, such as application 104 shown in FIG. 1 and application 204 shown in FIG. 2, with hardware components of computing device 300.

As shown in FIG. 3, one or more applications 318 may include an example input module 320, such as input module 106 shown in FIG. 1 and input module 206 shown in FIG. 2, and display module 322, such as display module 108 shown in FIG. 1, and display module 208 shown in FIG. 2. Input module 320 and display module 322 may each include program instructions and/or data that are executable by one or more processors 302 of computing device 300. For example, input module 320 may include instructions that cause one or more applications 318 executing on computing device 300 to perform one or more of the operations and actions described in FIGS. 1-2 and 4-7. Similarly, display module 322 may include instructions that cause one or more applications 318 executing on computing device 300 to perform one or more of the operations and actions described in FIGS. 1-2 and 4-7.

In some examples, input module 320 and/or display module 322 may be a part of operating system 316 executing on computing device 300. In some examples, input module 320 may receive input from input device 310 of computing device 300.

Any applications, e.g., one or more applications 318, implemented within or executed by computing device 300 may be implemented or contained within, operable by, executed by, and/or be operatively/communicatively coupled to components of computing device 300, e.g., one or more processors 302, memory 304, network interface 306, one or more storage devices 308, input device 310, and one or more output devices 312.

Figure 4:
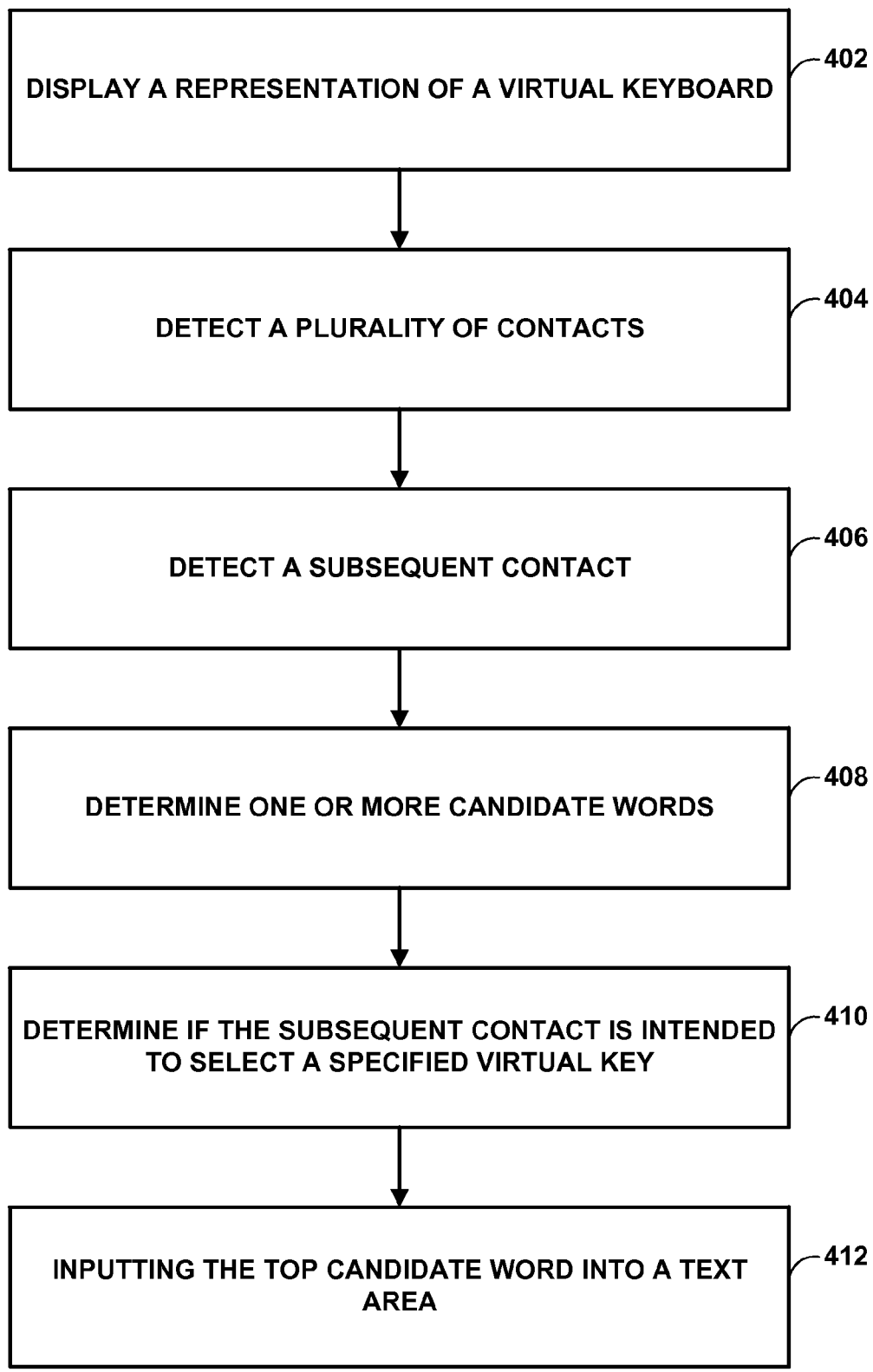
FIG. 4 is a flow chart illustrating an example operation of a process for predictive text correction and completion for text entry using virtual keyboards on touch-sensitive displays according to one or more aspects of the present disclosure.

FIG. 4 is a flow chart illustrating an example operation of a process for predictive text correction and completion for text entry using virtual keyboards on touch-sensitive displays. The process may include displaying, at a touch-sensitive display, such as touch-sensitive display 102 shown in FIG. 1 or touch-sensitive display 202 shown in FIG. 2, of a computing device, such as computing device 100 shown in FIG. 1 or computing device 200 shown in FIG. 2, a representation of a virtual keyboard including a plurality of virtual keys (402). The process may further include detecting, at the touch-sensitive display, a plurality of contacts within a portion of the touch-sensitive display associated with the representation of the virtual keyboard (404). The process may further include, after detecting the plurality of contacts, detecting, by the touch-sensitive display, a subsequent contact within the portion of the touch-sensitive display associated with the representation of the virtual keyboard (406). The process may further include determining, based on the plurality of contacts, one or more candidate words, each of the one or more candidate words including at least as many characters as a quantity of contacts included in the plurality of contacts (408). The process may further include determining if the subsequent contact is intended to select a specified virtual key based at least in part on if the subsequent contact is detected at a first location on the touch-sensitive display within an area of the touch-sensitive display associated with the specified virtual key, the area overlapping with at least a portion of a representation of the specified virtual key, the area further including at least a portion of the representation of the virtual keyboard outside of the representation of the specified virtual key, wherein the area is a first area if a top candidate word in the one or more candidate words has a greater number of characters than the quantity of contacts included in the plurality of contacts, and wherein the area is a second area, different from the first area, if the top candidate word has a same number of characters as the quantity contacts in the plurality of contacts (410). The process may further include, responsive to determining that the subsequent contact is intended to select the specified virtual key, inputting the top candidate word into a text area displayed at the touch-sensitive display (412).

In some examples, the second area may be larger than the first area. In some examples, the second area may overlap the first area. In some examples, the first area and the second area may be the same size.

In some examples, determining if the subsequent contact is intended to select the specified virtual key may be based at least in part on plurality of contacts.

In some examples, inputting the top candidate word into the text area further includes replacing one or more characters inputted via the plurality of contacts with the top candidate word.

In some examples, the process further includes determining that the subsequent contact is not intended to select a specified virtual key even if the subsequent contact is detected within the location on the touch-sensitive display within the area of the touch-sensitive display associated with the specified virtual key.

In some examples, the specified virtual key may include a virtual key corresponding to a terminator. In some examples, the specified virtual key may be a virtual spacebar key corresponding to a space.

In some examples, the process may further include displaying, at the touch-sensitive display, a suggestions menu listing the one or more candidate words.

In some examples, the plurality of contacts may include at least one contact that is detected within a representation of a virtual key not corresponding with a character at a corresponding location in the top candidate word.

In some examples, the at least one contact may be detected within a representation of a virtual spacebar key.

Figure 5:
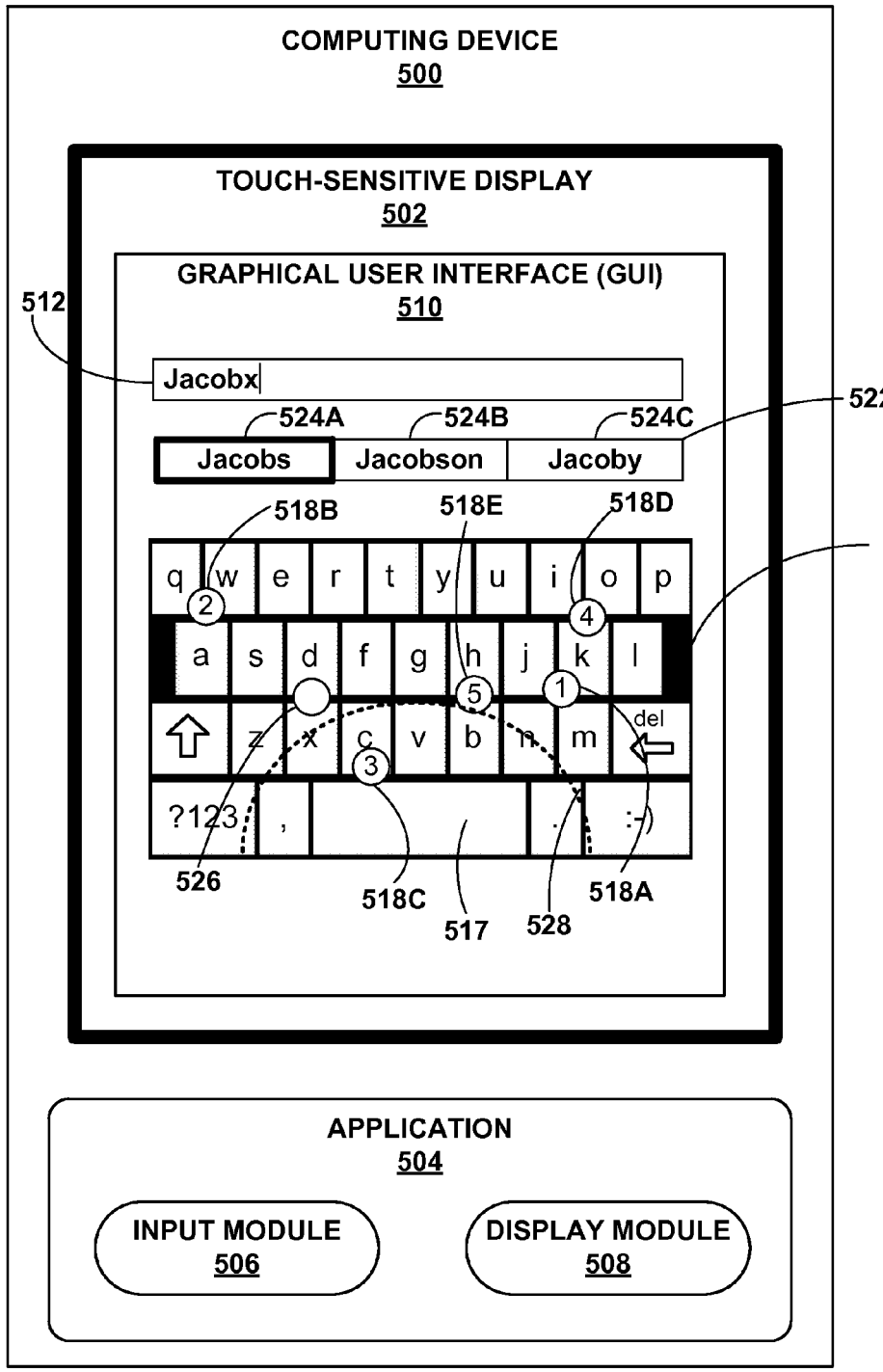
FIG. 5 is a block diagram illustrating further details of one example of computing device according to one or more aspects of the present disclosure.

FIG. 5 is a block diagram illustrating an example of a computing device, such as computing device 100 shown in FIG. 1 or computing device 200 shown in FIG. 2, configured to execute one or more applications according to some aspects of the present disclosure. As shown in FIG. 5, computing device 500 may include a touch-sensitive display 502 and an application 504. Application 504 may include input module 506 and display module 508. Graphical user interface (GUI) 510 may be displayed at touch-sensitive display 502.

Touch-sensitive display 502 may detect a plurality of contacts 518A-518E ("plurality of contacts 518") and a subsequent contact 526 after plurality of contacts 518 within a portion of touch-sensitive display 502 displaying a representation of virtual keyboard 516. As shown in FIG. 5, plurality of contacts 518 plus subsequent contact 526 may produce the following input: [j' a' c' o' b' d|x]. Top candidate word "Jacobs" 524A may not replace the inputted text of "Jacobx" because the input "d|x" produced by contact 526 is not within the area bounded by boundary 528, and thus contact 526 too far away from the representation of virtual spacebar key 517 to be determined as being intended to select virtual spacebar key 517. In other words, user 520 has made a typing mistake. User 520 may still contact or otherwise select top candidate word "Jacobs" 524A to replace the inputted text of "Jacobx" displayed in text area 512 with top candidate word "Jacobs" 524A. As can be seen, whether subsequent contact 526 is interpreted as user selection of virtual spacebar key 517 may depend on the distance of the subsequent contact 526 from a location within virtual spacebar key 517. In some examples, the location within virtual spacebar key 517 may be a median point within the virtual spacebar key 517, or may be the mean location of contacts received within the virtual spacebar key 517.

Figure 6:
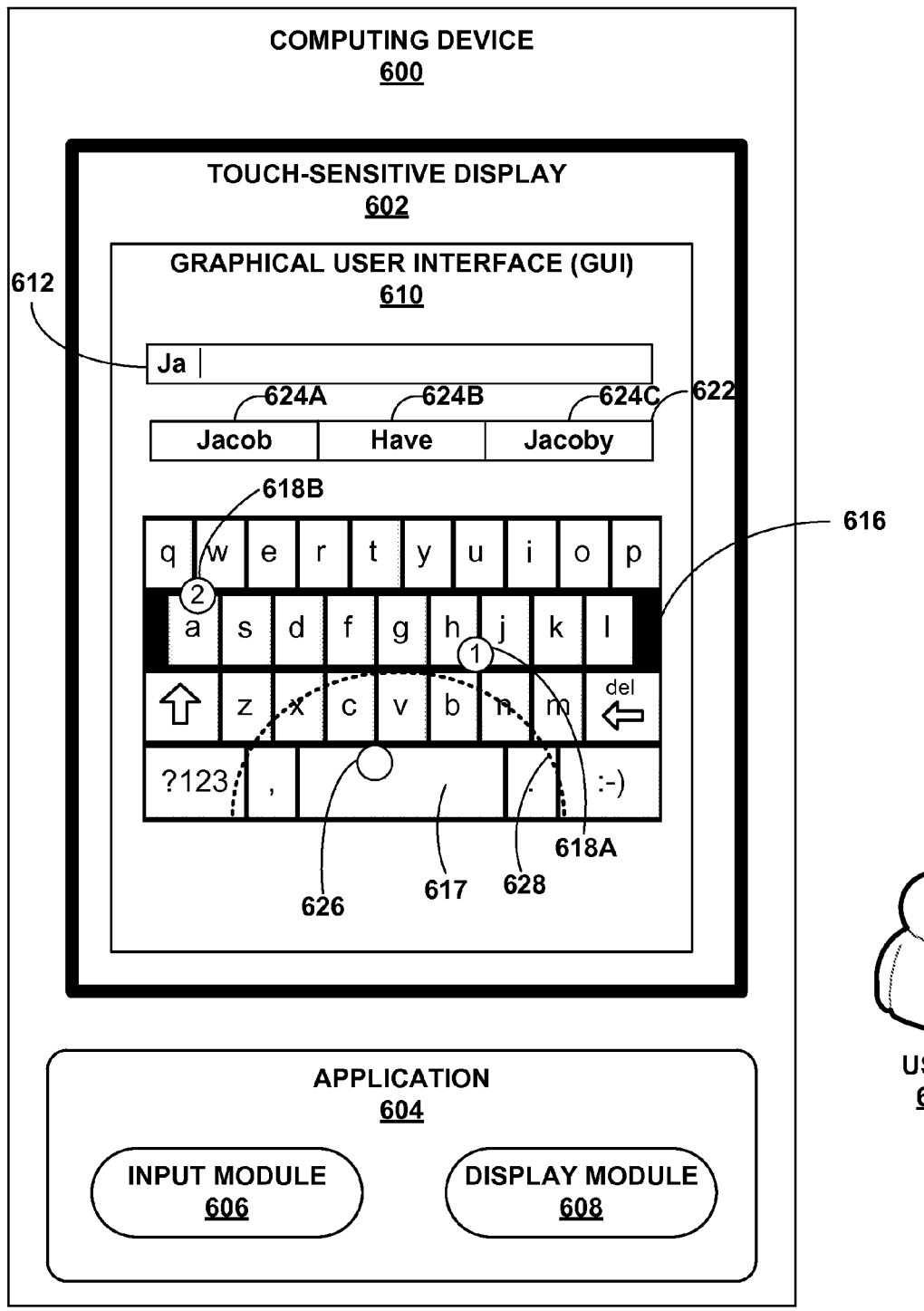
FIG. 6 is a block diagram illustrating further details of one example of computing device according to one or more aspects of the present disclosure.

FIG. 6 is a block diagram illustrating an example of a computing device, such as computing device 100 shown in FIG. 1, computing device 200 shown in FIG. 2, or computing device 500 shown in FIG. 5, configured to execute one or more applications according to some aspects of the present disclosure. As shown in FIG. 6, computing device 600 may include a touch-sensitive display 602 and an application 604. Application 604 may include input module 606 and display module 608. Graphical user interface (GUI) 610 may be displayed at touch-sensitive display 602.

Touch-sensitive display 602 may detect a plurality of contacts 618A-618B ("plurality of contacts 618") and a subsequent contact 626 after plurality of contacts 618 within a portion of touch-sensitive display 602 displaying a representation of virtual keyboard 616. As shown in FIG. 6, plurality of contacts 618 plus subsequent contact 626 may produce the following input: [j' a' sp]. In this example, the subsequent contact 626 located within virtual spacebar 617 does not cause the currently inputted text in text are 612 to be replaced with top candidate word "Jacobs" 624A because computing device 600 may determine that it more probable that user 620 intended to type [j a c] (to type "Jacob") or [h a v] (to type "have") instead of intending to type [j' a' sp], even though subsequent contact 626 is located within the area bounded by boundary 628. In other words, even though subsequent contact 626 is located within the area bounded by boundary 628, input module 606 may determine that it is more likely subsequent contact 626 intended to select the virtual key associated with the character "c" or the virtual key associated with the character "v" than to select virtual spacebar key 617. User 620 may still contact or otherwise select top candidate word "Jacob" 624A to replace the currently inputted text of "Ja" displayed in text area 612 with top candidate word "Jacob" 624A.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

Figure 7:
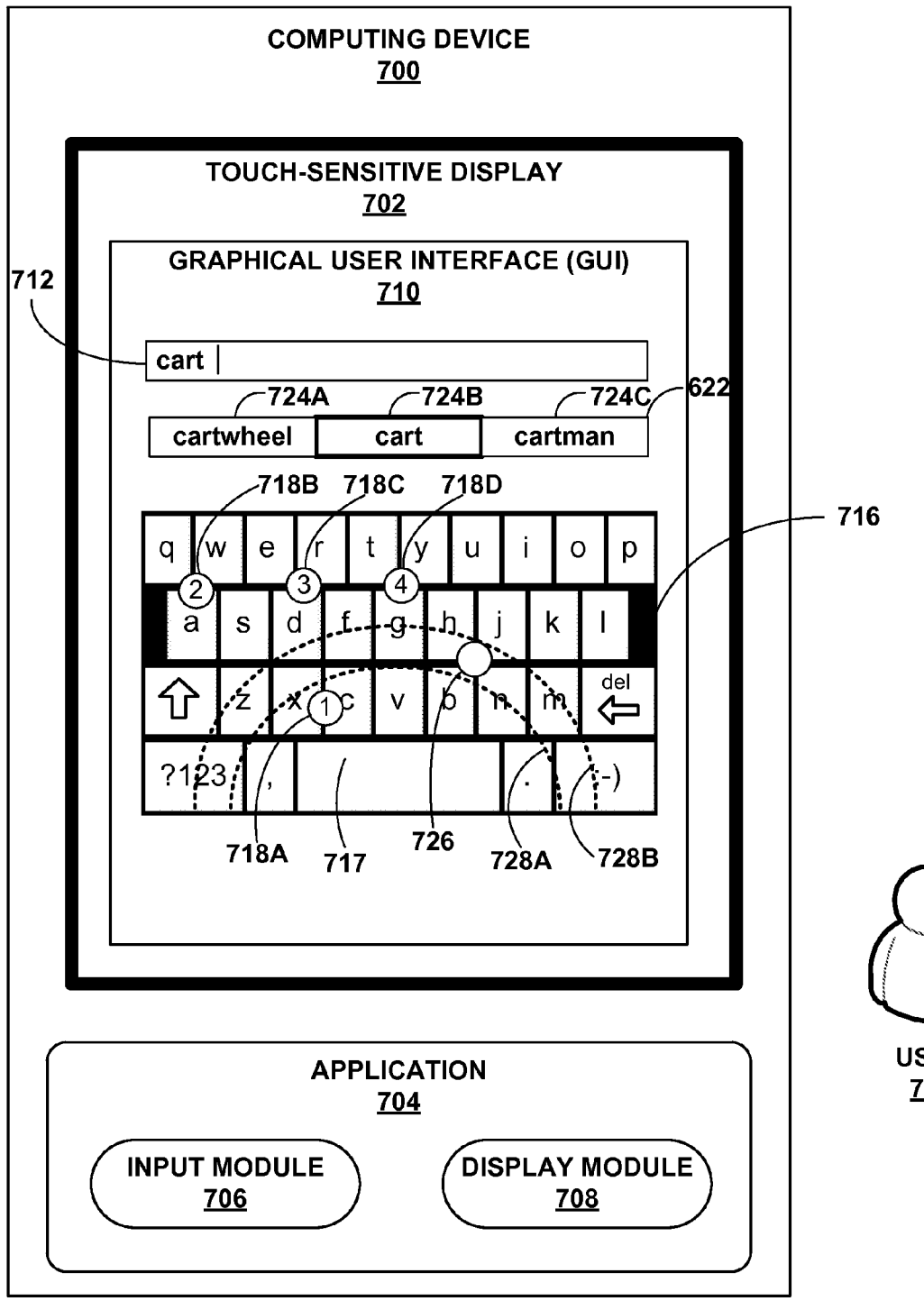
FIG. 7 is a block diagram illustrating further details of one example of computing device according to one or more aspects of the present disclosure.

FIG. 7 is a block diagram illustrating an example of a computing device, such as computing device 100 shown in FIG. 1 or computing device 200 shown in FIG. 2, configured to execute one or more applications according to some aspects of the present disclosure. As shown in FIG. 7, computing device 700 may include a touch-sensitive display 702 and an application 704. Application 704 may include input module 706 and display module 6708. Graphical user interface (GUI) 710 may be displayed at touch-sensitive display 702.

Touch-sensitive display 702 may detect a plurality of contacts 718A-718B ("plurality of contacts 718") and a subsequent contact 726 after plurality of contacts 718 within a portion of touch-sensitive display 702 displaying a representation of virtual keyboard 716. As shown in FIG. 7, plurality of contacts 718 plus subsequent contact 726 may produce the following input: [c' a' r' t' sp']. In this example, suggestion menu 722 may include top candidate word "cart wheel", second most probable candidate word "cart" 724B, and third most probable candidate word "cartman" 724C.

In the example illustrated in FIG. 7, although it may be expected that the subsequent contact 726 may cause "cartwheel" to be inputted into text area 712, subsequent contact 726 is not deemed to be intended to select virtual spacebar key 717 because subsequent contact 726 is located outside of the area bounded by boundary 728A. As discussed above, there may be a tighter tolerance to determine if subsequent contact 726 is intended to select virtual spacebar key 717 because top candidate word "cartwheel" 724A includes a greater quantity of characters than the quantity of contacts included in plurality of contacts 718. Therefore, subsequent contact 726 may need to be located within the area bounded by boundary 728A instead of the larger area bounded by boundary 728B. Because input module 706 determines that subsequent contact 726 was not intended to select virtual spacebar key 717 for the purposes of replacing the currently inputted text in text area 712 with top candidate word "cartwheel" 724A, and because the location of subsequent contact 726 is far enough away from the virtual key associated with the character "w", the receipt of subsequent contact 726 may cause "cartwheel" to be eliminated as a possible candidate word, and second most probable word "cart" 724B may become the candidate word that may be inputted into text area 712 to replace the currently inputted text in text area 712.

Because "cart" includes the same quantity of characters as the quantity of contacts in the plurality of contacts 718, there may be a looser tolerance to determine if subsequent contact 726 is intended to select virtual spacebar key 717 if second most probable candidate word "cart" 724B is instead the candidate word that may be inputted into text area 712 to replace the currently inputted text in text area 712. Therefore, because subsequent contact 726 is located within the area bounded by boundary 728B, input module 706 may input second most probable candidate word "cart" 724B plus a subsequent space character into text area 712 to replace the currently inputted text in text area 712. As can be seen, computing device 700 may estimate the probability of user selection of a top candidate word having a greater number of characters than the number of contacts in the plurality of contacts 718 separately from estimating the probability of user selection of the top candidate word having the same number of characters as the number of contacts in the plurality of contacts 718, so that the probability threshold for determining whether virtual spacebar key 717 is selected by user 720 to select the top candidate word may be more likely to be triggered if the top candidate word includes the same number of characters as the number of contacts in the plurality of contacts 718 than if the top candidate word includes a greater number of characters than the number of contacts in the plurality of contacts 718.

Figure 8:
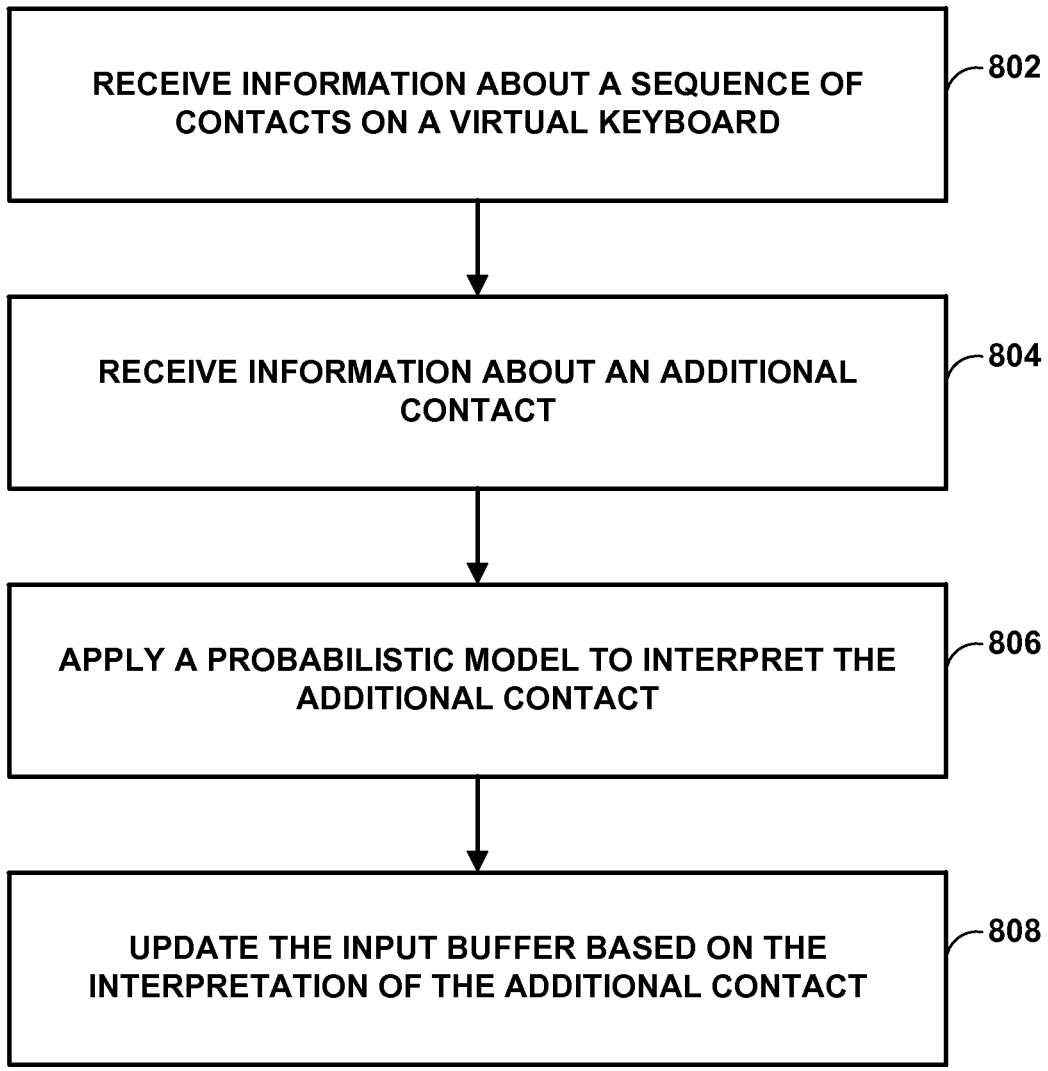
FIG. 8 is a flow chart illustrating an example operation of a process for predictive text correction and completion for text entry using virtual keyboards on touch-sensitive displays according to one or more aspects of the present disclosure.

FIG. 8 is a flow chart illustrating an example operation of a process for predictive text correction and completion for text entry using virtual keyboards on touch-sensitive displays. The process may include receiving information by an input module, such as input module 106 shown in FIG. 1, about a sequence of contacts by a user, such as user 120 shown in FIG. 1, on a virtual keyboard, such as virtual keyboard 116 shown in FIG. 1, the sequence being associated with a predicted word and a probability for the predicted word, wherein the sequence of contacts corresponds to contacts made by the user for an entry of a word. The process may further include receiving information by the input module about an additional contact in the sequence of contacts. The process may include applying, by a computing device, such as computing device 100 shown in FIG. 1, a probabilistic model that accounts for information about the spatial location of the additional contact and information about the predicted word, to interpret the additional contact as a (i) user selection of the predicted word having a same number of characters as a number of contacts in the sequence of contacts, or (ii) user selection of the predicted word having a greater number of characters than the number of contacts in the sequence of contacts; or to interpret the additional contact as a (i) user selection of the predicted word having a same number of characters as a number of contacts in the sequence of contacts, (ii) user selection of the predicted word having a greater number of characters than the number of contacts in the sequence of contacts, (iii) user input of a non-space character. The process may further include updating, by the computing device, an input buffer based on the interpretation of the additional contact by the probabilistic model.

The process may further include displaying at least a portion of the updated input buffer on a screen, such as touch-sensitive display 102 shown in FIG. 1, to the user. In some examples, the information about the spatial location is based on a distance of the additional contact from a location within the virtual spacebar key.

In some examples, the probabilistic model comprises a language model that predicts words based on at least the sequence of contacts and a spatial model that predicts a character for the additional contact based on the information about the spatial location of the additional contact. In some examples, the probabilistic model estimates the probability of user selection of the predicted word having a same number of characters as the number of contacts in the sequence of contacts separately from estimating the probability of user selection of the predicted word having a greater number of characters than the number of contacts in the sequence of contacts. In some examples, the probabilistic model comprises a first probability threshold for determining user selection of the predicted word having the same number of characters as the number of contacts in the sequence of contacts, and a second probability threshold for determining user selection of the predicted word having a greater number of characters than the number of contacts in the sequence of contacts. In some examples, triggering the first probability threshold is more likely than triggering the second probability threshold.

In some examples, the probabilistic model interfaces with a spatial model that determines a probability that an input key is selected based on the spatial location of the contact. In some examples, the probabilistic model interfaces with a language model that determines a probability that an input key is selected based on previous contacts in the sequence of contacts. In some examples, the sequence of contacts comprises contacts received subsequent to completion of a prior word or contacts initially received from a user prompted for input.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects of the disclosure have been described. These and other aspects are within the scope of the following claims.

The invention claimed is:

1. A computer-implemented method comprising:
receiving, by a computing device, an indication of at least two contacts at a region of a presence-sensitive screen that outputs a virtual keyboard, the at least two contacts constituting a sequence of contacts and being associated with a predicted word and a probability for the predicted word;
receiving, by the computing device, an indication of a third contact at the region of the presence-sensitive screen;
applying, by the computing device, a probabilistic model based on a spatial location of the third contact and the predicted word, wherein the spatial location is based on a distance of the third contact from a location within a virtual spacebar key, the probabilistic model configured to interpret the third contact as at least one of (i) a selection of the predicted word, wherein the predicted word has a same number of characters as a number of contacts in the sequence of contacts, (ii) a selection of the predicted word, wherein the predicted word has a greater number of characters than the number of contacts in the sequence of contacts, and (iii) a user input of a non-space character; and
updating an input buffer based on an interpretation of the third contact, the interpretation being based on the probabilistic model.

2. The method of claim 1, further comprising:
outputting at least a portion of the updated input buffer for display at the presence-sensitive screen.

3. The method of claim 1, wherein the probabilistic model comprises a language model that predicts words based on at least the sequence of contacts and a spatial model that predicts a character for the third contact based on the information about the spatial location of the third contact.

4. The method of claim 3, wherein the probabilistic model estimates a probability of selection of the predicted word having a same number of characters as the number of contacts in the sequence of contacts separately from estimating the probability of selection of the predicted word having a greater number of characters than the number of contacts in the sequence of contacts.

5. The method of claim 4, wherein the probabilistic model comprises a first probability threshold for determining selection of the predicted word having the same number of characters as the number of contacts in the sequence of contacts, and a second probability threshold for determining selection of the predicted word having a greater number of characters than the number of contacts in the sequence of contacts.

6. The method of claim 5, wherein triggering the first probability threshold is more likely than triggering the second probability threshold.

7. The method of claim 1, wherein the probabilistic model interfaces with a spatial model that determines a probability that an input key is selected based on the spatial location of the third contact.

8. The method of claim 1, wherein the probabilistic model interfaces with a language model that determines a probability that an input key is selected based on previous contacts in the sequence of contacts.

9. The method of claim 1, wherein the sequence of contacts comprises contacts received subsequent to completion of at least one of a prior word and contacts initially received in response to a prompt for input.

10. A non-transitory computer-readable storage device comprising instructions that, when executed by at least one programmable processor, cause the at least one programmable processor to perform operations comprising:
receiving an indication of at least two contacts at a region of a presence-sensitive screen that outputs virtual keyboard, the at least two contacts constituting a sequence of contacts and being associated with a predicted word and a probability for the predicted word;
receiving an indication of a third contact at the region of the presence-sensitive screen;
applying a probabilistic model based on a spatial location of the third contact and the predicted word, wherein the spatial location is based on a distance of the third contact from a location within the virtual spacebar key, the probabilistic model configured to interpret the third contact as at least (i) a selection of the predicted word, wherein the predicted word has a same number of characters as a number of contacts in the sequence of contacts, (ii) a selection of the predicted word, wherein the predicted word has a greater number of characters than the number of contacts in the sequence of contacts, and (iii) a user input of a non-space character; and
updating an input buffer based on an interpretation of the third contact, the interpretation being based on the probabilistic model.

11. The non-transitory computer-readable storage device of claim 10, further comprising:
outputting at least a portion of the updated input buffer for display at the presence-sensitive screen.

12. The non-transitory computer-readable storage device of claim 10, wherein the probabilistic model comprises a language model that predicts words based on at least the sequence of contacts and a spatial model that predicts a character for the additional contact based on the information about the spatial location of the third contact.

13. The computer-readable storage device of claim 12, wherein the probabilistic model estimates a probability of selection of the predicted word having a same number of characters as the number of contacts in the sequence of contacts separately from estimating the probability of selection of the predicted word having a greater number of characters than the number of contacts in the sequence of contacts.

14. The non-transitory computer-readable storage device of claim 13, wherein the probabilistic model comprises a first probability threshold for determining selection of the predicted word having the same number of characters as the number of contacts in the sequence of contacts, and a second probability threshold for determining selection of the predicted word having a greater number of characters than the number of contacts in the sequence of contacts.

15. The non-transitory computer-readable storage device of claim 14, wherein triggering the first probability threshold is more likely than triggering the second probability threshold.

16. The non-transitory computer-readable storage device of claim 10, wherein the probabilistic model interfaces with a spatial model that determines a probability that an input key is selected based on the spatial location of the third contact.

17. The non-transitory computer-readable storage device of claim 10, wherein the probabilistic model interfaces with a language model that determines a probability that an input key is selected based on previous contacts in the sequence of contacts.

18. The non-transitory computer-readable storage device of claim 10, wherein the sequence of contacts comprises contacts received subsequent to completion of at least one of a prior word and contacts initially received in response to a prompt for input.

19. A computing device comprising:
one or more processors; and
at least one module operable by the one or more processors to:
receive an indication of at least two contacts at a region of a presence-sensitive screen that outputs a virtual keyboard, the at least two contacts constituting a sequence of contacts and being associated with a predicted word and a probability for the predicted word;
receive an indication of a third contact at the region of the presence-sensitive screen;
apply a probabilistic model based on a spatial location of the third contact and the predicted word, wherein the spatial location is based on a distance of the third contact from a location within the virtual spacebar key, the probabilistic model configured to interpret the third contact as at least one of (i) a selection of the predicted word, wherein the predicted word has a same number of characters as a number of contacts in the sequence of contacts, (ii) a selection of the predicted word, wherein the predicted word has a greater number of characters than the number of contacts in the sequence of contacts, and (iii) a user input of a non-space character; and
update an input buffer based on an interpretation of the third contact, the interpretation being based on the probabilistic model.

20. The computing device of claim 19, wherein the at least one module is operable by the one or more processors to:
output at least a portion of the updated input buffer for display at the presence-sensitive screen.

21. The computing device of claim 19, wherein the probabilistic model comprises a language model that predicts words based on at least the sequence of contacts and a spatial model that predicts a character for the third contact based on the information about the spatial location of the third contact.

22. The computing device of claim 21, wherein the probabilistic model estimates a probability of selection of the predicted word having a same number of characters as the number of contacts in the sequence of contacts separately from estimating the probability of selection of the predicted word having a greater number of characters than the number of contacts in the sequence of contacts.

23. The computing device of claim 22, wherein the probabilistic model comprises a first probability threshold for determining selection of the predicted word having the same number of characters as the number of contacts in the sequence of contacts, and a second probability threshold for determining selection of the predicted word having a greater number of characters than the number of contacts in the sequence of contacts.

24. The computing device of claim 23, wherein triggering the first probability threshold is more likely than triggering the second probability threshold.

25. The computing device of claim 19, wherein the probabilistic model interfaces with a spatial model that determines a probability that an input key is selected based on the spatial location of the third contact.

26. The computing device of claim 19, wherein the probabilistic model interfaces with a language model that determines a probability that an input key is selected based on previous contacts in the sequence of contacts.

27. The computing device of claim 19, wherein the sequence of contacts comprises contacts received subsequent to completion of at least one of a prior word and contacts initially received in response to a prompt for input.

* * * * *